United States Patent
Shoji et al.

(10) Patent No.: US 7,482,602 B2
(45) Date of Patent: Jan. 27, 2009

(54) SCINTILLATOR PLATE FOR RADIATION AND PRODUCTION METHOD OF THE SAME

(75) Inventors: Takehiko Shoji, Hachioji (JP); Yasushi Nakano, Hino (JP); Mika Sakai, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/593,300

(22) Filed: Nov. 6, 2006

(65) Prior Publication Data

US 2007/0108393 A1     May 17, 2007

(30) Foreign Application Priority Data

Nov. 16, 2005 (JP) .............................. 2005-331639
Dec. 7, 2005 (JP) .............................. 2005-353253

(51) Int. Cl.
    *G01J 1/58*     (2006.01)
(52) U.S. Cl. ................................................. 250/483.1
(58) Field of Classification Search ............. 250/483.1, 250/484.2, 484.4; 252/301.36, 301.4 R, 252/600; 423/499.1
See application file for complete search history.

(56) References Cited

U.S. PATENT DOCUMENTS

| | | | | |
|---|---|---|---|---|
| 3,961,182 | A | * | 6/1976 | Spicer .................. 250/214 VT |
| 4,101,781 | A | * | 7/1978 | Neukermans et al. .... 250/483.1 |
| 4,663,187 | A | * | 5/1987 | Persyk et al. .................. 427/65 |
| 4,803,366 | A | * | 2/1989 | Vieux et al. .............. 250/486.1 |
| 4,806,757 | A | * | 2/1989 | Kano et al. .................. 250/581 |
| 4,839,090 | A | * | 6/1989 | Rosette et al. ......... 252/301.4 H |
| 5,028,509 | A | * | 7/1991 | Shimada et al. ............. 430/139 |
| 5,541,012 | A | * | 7/1996 | Ohwaki et al. .............. 428/690 |
| 6,320,303 | B1 | * | 11/2001 | Noji et al. .................... 313/365 |
| 2005/0199819 | A1 | * | 9/2005 | Wieczorek ............. 250/370.11 |

* cited by examiner

*Primary Examiner*—David P Porta
*Assistant Examiner*—David S Baker
(74) *Attorney, Agent, or Firm*—Frishauf, Holtz, Goodman & Chick, P.C.

(57) ABSTRACT

A scintillator plate for radiation comprising a substrate having thereon a phosphor layer comprising CsI and two or more activators ach having a melting point different from a melting point of CsI, wherein each content of the two or more activators is 0.01% or more based on CsI; and the scintillator plate is produced by forming the phosphor layer on the substrate via a vacuum evaporation method using a source material comprising CsI and two or more activators.

4 Claims, 3 Drawing Sheets

SCINTILLATOR PLATE FOR RADIATION AND PRODUCTION METHOD OF THE SAME

This application is based on Japanese Patent Applications No. 2005-331639 filed on Nov. 16, 2005, and No. 2005-353253 filed on Dec. 7, 2005 Japanese Patent office, the entire content of which is hereby incorporated by reference.

FIELD OF THE INVENTION

The present invention relates to a scintillator plate for radiation principally composed of cesium iodide and a production method of the scintillator plate.

BACKGROUND OF THE INVENTION

Hitherto, radiation images such as X-ray images have been widely applied for diagnosing in medical field. Particularly, an intensifying screen-film radiation image forming system is still used in the medical field in the world as an image forming system having high reliance and superior cost performance as a result of improvement in sensitivity and image quality in long history of the system. However, obtained in this system are analog data which are not suitable for easy image processing nor quick image transfer.

After that, as a digital radiography system, computed radiography (CR) has been developed. In the CR system, a digital radiographic image is directly obtained and can be displayed on a display device such as a cathode ray tube or a liquid crystal panel, whereby image formation on a photographic film has become unnecessary, and the convenience of diagnosis in hospitals or in medical clinics has become largely improved.

The CR system has been mainly adopted in the medical field where X-ray radiographic images have been obtained using stimulable phosphor plates. Herein, "stimulable phosphor plate" has a structure in which a layer of stimulable phosphor is formed on a substrate and it has a function of (i) storing the radiation passed through an object; and (ii) releasing the stored energy as stimulated light emission of which intensity depends on the dose of stored radiation, by being irradiated with an electromagnetic wave (stimulating light) such as infrared rays to sequentially excite the stimulable phosphor.

However, the stimulable phosphor plate has not been fully satisfactory in providing an enough S/N ratio (Signal to Noise ratio), an enough visibility nor an enough spatial resolution of the image and the image quality has not been as high as that of the intensifying screen-film system. As a new digital image forming technology, Flat Panel Detector (FPD) utilizing thin film transistors (TFT) has been developed, which has been reported, for example, in "Amorphous Semiconductor Usher in Digital X-ray Imaging", John Rowlands et al., Physics Today (November, 1997), p 24, or in "Development of a High Resolution, Active Matrix, Flat-Panel Imager with Enhanced Fill Factor", L. E. Antonuk, SPIE (1997), Vol. 32, P2. The FPD enables to obtain radiographic images as digital information and enables to freely process or quickly transfer the digital image data.

Also, the FPD has advantages in that it is smaller in size and has superior properties in displaying moving pictures when compared with the CR system. However, the same as in the CR system, the image quality of FPD has not fully been as high as that of the intensifying screen-film system and further improvement has been desired.

In FPD, utilized is a scintillator plate having an X-ray sensitive phosphor to convert the radiation to visible rays, however, the S/N ratio of the scintillator has not fully been large enough due to a considerably large electric noise generated from the TFTs or from the electric circuits to drive the TFTs, when the dose of radiation is low, resulting in failing to provide an enough emitting efficiency to attain high quality images.

The light emission efficiency generally depends on the thickness of the phosphor layer, however, when the thickness of the phosphor layer increases, the sharpness of the image by the scintillator plate is lowered due to the scattering of emitted light in the phosphor layer.

Consequently, investigation of materials has proceeded by which the lowering in sharpness can be inhibited while sufficiently keeping the thickness of the phosphor layer. As a result of that, cesium iodide has been utilized. Cesium iodide exhibits high efficiency of conversion from radiation to visible light and the columnar crystals thereof can be easily formed by vacuum evaporation. Therefore, scatter of the emitted light in the crystal can be inhibited by the light guiding effect of the columnar crystals even when the phosphor layer is made thick.

When a phosphor layer containing CsI is formed, various activators are used because the emission efficiency is not enough when CsI is used alone, and when the content of an activator is 0.01 mol % or more based on CsI (based on the mole of CsI) base material, improved emission efficiency is obtained.

For example, in Patent Document 1, disclosed is a technique in which an X-ray sensitive phosphor exhibiting an improved radiation-visible ray conversion efficiency is obtained by vacuum evaporating a mixture of CsI and sodium iodide (NaI) in an arbitrary mixing ratio onto a substrate to deposit sodium activated cesium iodide (CsI:NaI) crystals, followed by annealing.

Recently, a technique to prepare an X-ray sensitive phosphor has been disclosed, for example, in Patent Document 2, in which CsI is deposited via vacuum evaporation and an activator, for example, indium (In), thallium (Th), lithium (Li), potassium (K), rubidium (Rb) or sodium (Na) is deposited via sputtering.

However, even when the techniques as disclosed in Patent Documents 1 and 2 are used to prepare an X-ray sensitive phosphor, the emission efficiency when irradiated with X-rays have not fully been high enough. Specifically, in Patent Document 2, activators of CsI have been described, however, melting points of the activators have not been considered, and further improvement in the emission efficiency of the phosphor when irradiated is being studied.

Patent Document 1 Examined Japanese Patent Publication No. 54-35060

Patent Document 2 JP-A No. 2001-59899

(JP-A representing Japanese Patent Publication Open to Public Inspection)

SUMMARY OF THE INVENTION

An object of the present invention is to provide a scintillator plate for radiation which enables to exhibit a higher emission efficiency and to provide a production method thereof.

One of the aspects of the present invention to attain the above object is a scintillator plate for radiation comprising a substrate having thereon a phosphor layer comprising CsI and two or more activators each having a melting point different from a melting point of CsI, wherein each content of the two or more activators is 0.01 mol % or more based on CsI; and the scintillator plate is produced by forming the phosphor layer on the substrate via a vacuum evaporation method using a source material comprising CsI and the two or more activators.

Another aspect of the present invention to attain the above object is a method to produce a scintillator plate for radiation comprising the steps of: (i) heating a mixture comprising CsI and an activator at 350-620° C. for one hour or more; and (ii) vacuum evaporating the mixture onto a substrate to form a phosphor layer after step (i).

DESCRIPTION OF THE PREFERRED EMBODIMENTS

The above object of the present invention is achieved by the following structures.

(1) A scintillator plate for radiation comprising a substrate having thereon a phosphor layer comprising CsI and two or more activators each having a melting point different from a melting point of CsI, wherein each content of the two or more activators is 0.01 mol % or more based on CsI; and the scintillator plate is produced by forming the phosphor layer on the substrate via a vacuum evaporation method using a source material comprising CsI and the two or more activators.

(2) The scintillator plate of Item (1) wherein
the two or more activators comprise a first activator having a melting point within ±50° C. of the melting point of CsI.

(3) The scintillator plate of Item (2), wherein
the first activator comprises at least one selected from the group consisting of copper iodide, europium iodide, sodium iodide, rubidium iodide and manganese iodide.

(4) The scintillator plate of Item (2) or (3), wherein
the two or more activators comprise a second activator having a melting point different from the melting point of the first activator by 100° C. or more.

(5) The scintillator plate of Item (4), wherein
the second activator is thallium iodide.

(6) A method to produce a scintillator plate for radiation comprising the steps of:
(i) heating a mixture comprising CsI and an activator at 350-620° C. for one hour or more; and
(ii) vacuum evaporating the mixture onto a substrate to form a phosphor layer after step (i).

(7) The method of Item (6), wherein
the activator comprises one or more elements selected from the group consisting of indium, thallium, lithium, potassium, rubidium, sodium and europium.

(8) The method of Item (6) or (7), wherein
the activator is thallium iodide or thallium bromide.

(9) The method of any one of Item (8), wherein
a content of thallium iodide is 0.01-10 mol % based on CsI.

(10) The method of any one of Items (6) to (9), wherein
the phosphor layer comprises columnar crystals.

(11) The method of any one of Items (6) to (10), wherein
in step (i), the mixture is heated while the mixture is loaded in a holder; and
in step (ii), the mixture is vacuum evaporated while. the mixture is loaded in the holder.

(12) The method of any one of Items (6) to (11), wherein
in step (i), the mixture is heated under a vacuum atmosphere of 0.1 Pa or less, under an inert gas atmosphere or under a reducing gas atmosphere.

(13) A scintillator plate for radiation produced by the method of any one of Items (6) to (12).

According to the present invention, the interior of the crystals of the phosphor layer formed in the vapor evaporation process can be made more transparent and the light emission efficiency of the phosphor layer can be further increased (refer the following examples).

The best embodiment to achieve the present invention is described below, while referring to the drawings. In the following embodiments, various limitations technically preferable for embodying the present invention are described, but the scope of the present invention is not limited to the following embodiments nor to the drawings.

First, the constitution of scintillator plate 10 relating to the present invention will be described referring to FIG. 1.

Figure 1:
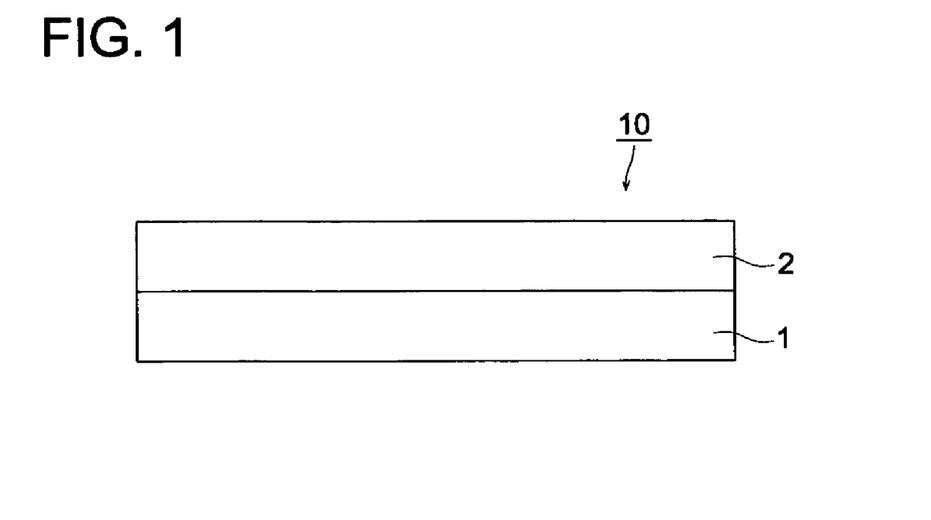
FIG. 1 shows a schematic cross-section of the scintillator plate 10.

As shown in FIG. 1, the scintillator plate 10 is constituted by a phosphor layer 2 formed on a substrate 1. The phosphor layer 2 absorbs radiation energy and emits electromagnetic waves at wavelengths of 300 to 800 nm, namely light of the range of ultraviolet to infrared covering the visible light when the phosphor layer 2 is irradiated.

The substrate 1 is transparent to radiation such as X-ray and is composed of resin, glass or metal plate. An aluminum plate having a thickness of not more than 1 mm and a resin such as a carbon fiber-strengthen resin sheet are preferably used from the viewpoint of improving durability and reducing the weight.

The phosphor layer 2 is prepared by forming crystals containing Cs as a base material and preferably contains CsI.

In one embodiment of the present invention, the phosphor layer 2 contains a plurality of activators having different melting points. The content of each of the plurality of activators is 0.01 mol % or more based on CsI. When the content of each activator is less than 0.01 mol % based on CsI, the luminance of the resulting phosphor is not greatly improved compared to the luminance of a phosphor in which CsI is used alone, whereby desired luminance cannot be attained. The content of each activator prescribed as above denote the content in the material itself forming the phosphor layer 2. In the present invention, since the phosphor layer 2 is formed via vacuum evaporation as described later, the material forming the phosphor layer 2 denotes the raw material used as the source of vacuum evaporation.

As one of the preferable conditions to be satisfied by the plurality of activators contained in the phosphor layer 2, at least one of the activators has a melting point within ±50° C. of the melting point of CsI, namely, 621° C., this activator being designated as the first activator. Examples of the first activator include: copper iodide (605° C.), europium iodide (580° C.), sodium iodide (651° C.), rubidium iodide (642° C.) and manganese iodide (613°C.). The content of the first activator is preferably 0.01-10 mol % and more preferably 0.1 to 3.0 mol %, based on CsI.

As another preferable condition to be satisfied by the plurality of activators contained in the phosphor layer 2, an activator has a melting point different from the first activator by 100° C. or more, this activator being designated as the second activator. Examples of the second activator include: thallium iodide (441° C.). The content of the second activator is preferably 0.01-10 mol % and more preferably 0.1 to 3.0 mol %, based on CsI. In the present invention, the "melting point" denotes the melting point under the normal pressure.

The method to form the phosphor layer 2 on the substrate will now be explained.

The phosphor layer 2 is formed via vacuum evaporation.

Vacuum evaporation is carried out as follows:

(a) the substrate 1 is fixed in a known vacuum evaporation apparatus;

(b) a raw material to be used as the evaporation source of the phosphor layer 2 containing activators as prescribed above is loaded in the apparatus;

(c) while evacuating the inside of the apparatus, inert gas such as nitrogen is introduced from the inlet to obtain a vacuum of 1.333 to $1.333 \times 10^{-3}$ Pa; and (d) at least one phosphor source material is heated to evaporation by means of a resistance heating method or a electron beam method to form a phosphor layer of desired thickness.

Thus the phosphor layer 2 is formed on the substrate 1. This vacuum evaporation may be carried out in a plurality of times to form the phosphor layer 2.

For example, a plurality of evaporation sources having the same composition are equipped, and after finishing vacuum evaporation from one evaporation source, next vacuum evaporation from the next evaporation source is carried out. This procedure is repeated until a desired thickness of the phosphor layer 2 is obtained. When vacuum evaporation from one evaporation source is carried out, deposition of a material having a lower melting point occurs first on the substrate 1, accordingly, the ratio of a material having a higher melting point becomes higher in the outer most surface of the phosphor layer 2 when vacuum evaporation from one evaporation source is finished. Therefore, by conducting vacuum evaporation in a plurality of times using a plurality of evaporation sources, a phosphor layer 2 exhibiting homogeneous light emission in the thickness direction of the phosphor layer is obtained even when a plurality of activators having different melting points are contained. The substrate 1 may be cooled or heated while vacuum evaporation is carried out, and, further, the phosphor layer 2 deposited on the substrate 1 may be simultaneously subjected to a heat treatment after the vacuum evaporation.

The apparatus for vacuum evaporation will be described later.

The scintillator plate 10 for radiation will now be explained.

When the scintillator plate 10 for radiation is irradiated with radioactive rays from the direction of the phosphor layer 2, the energy of the radioactive rays is absorbed by the phosphor layer 2 and the phosphor layer 2 emits electromagnetic waves (light) of which intensity depends on the intensity of the radioactive rays.

Since the phosphor layer contains a plurality of activators, the emitted light exhibits the properties originated from each of the activators. And, at the same time, the phosphor layer 2 is homogeneously prepared and the distribution of light emitted from the phosphor layer is homogeneous. As the results, the efficiency of instantaneous light emission of the phosphor 2 and the sensitivity of the scintillator 10 are largely improved.

As described above, in the scintillator plate 10 of the present invention, the luminance can be improved by notably improving the light emission efficiency of the phosphor layer 2 when irradiated with radioactive rays, resulting in providing a higher S/N ratio of the radiographic images obtained under radioactive rays of lower dose.

Figure 2:
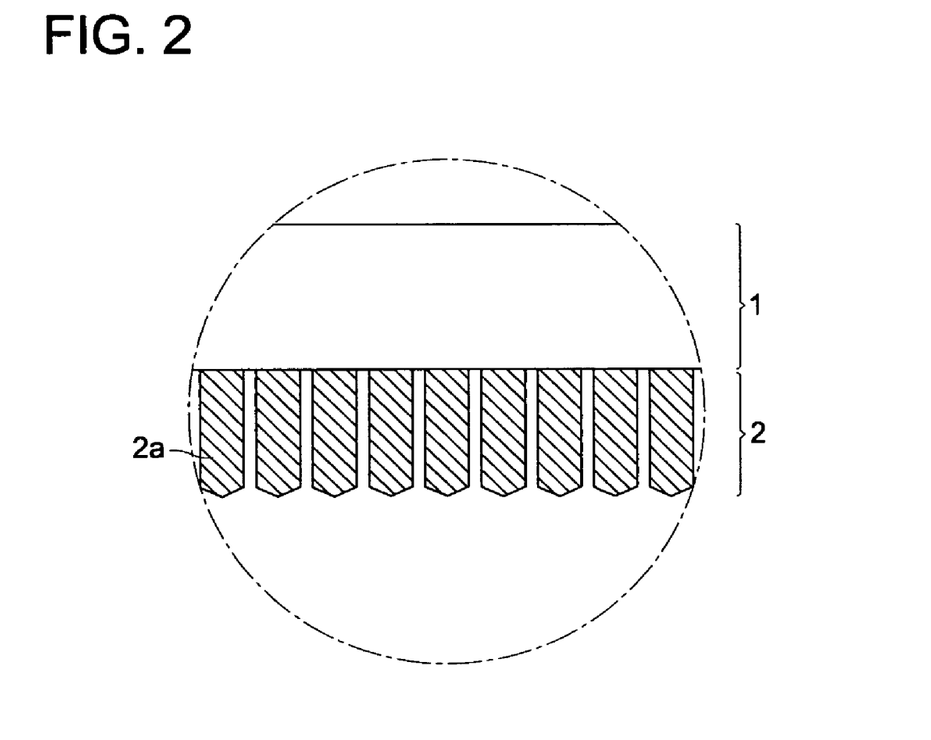
FIG. 2 shows an enlarged cross-section of the scintillator plate 10.

In another embodiment of the present invention, the phosphor layer 2 is mainly composed of cesium iodide; in detail, the layer is formed by vacuum evaporating cesium iodide and an activator by heating the mixture thereof at a temperature of from 350 to 620° C. for a time of 1 hour or more to form a layer of the mixture on the substrate 1. As shown in FIG. 2, the phosphor layer 2 is constituted by innumerable columnar crystals 2a which are formed on the substrate 1 in an aggregated state.

In the mixture as the raw material of the phosphor layer 2, thallium iodide is used as the activator and the mixing ratio of thallium iodide to cesium iodide is 0.01 to 10 mol % and preferably 0.01 to 3.0 mol %.

The activator in the mixture may be any known compound as long as the principal composition of the phosphor layer 2 is cesium iodide and can be optionally selected according to desired characteristics of the phosphor layer 2 such as wavelength of emitting light and moisture resistivity thereof. Examples of the activator usable instead of thallium iodide include thallium bromide and a compound containing one or more kind of element of indium, thallium, lithium, potassium, rubidium, sodium, europium, copper, cerium, zinc, titanium, gadolinium and terbium.

The vacuum evaporation apparatus 61 to be used for producing the scintillator plate 10 is described below referring FIG. 3.

Figure 3:
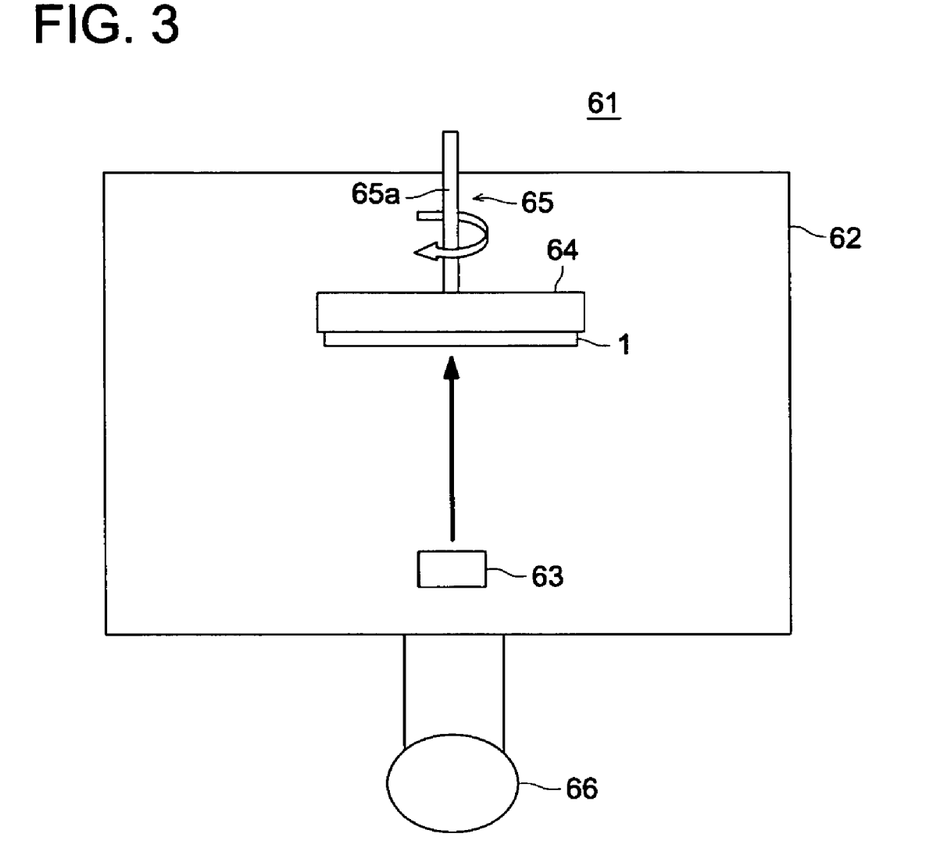
FIG. 3 shows a schematic constitution of the vacuum evaporation apparatus 61.

As is shown in FIG. 3, the vacuum evaporation apparatus 61 has a box type vacuum container 62 and a boat for vacuum evaporation 63 is provided in the vacuum container 62. The boat 63 is a device in which the material to be vacuum evaporated is charged and an electrode is connected to the boat 63. The boat 63 generates heat by Joule heat when electric current is applied through the electrode. On the occasion of production of the scintillator plate 10, a mixture containing cesium iodide and the activator is charged into the boat 63 and the mixture is heated and vaporized by applying electric current to the boat 63.

Moreover, an alumina crucible rounded by a heater or a device heated by a heater made from a high-melting point metal may be applied as the device in which the materials are charged.

In the vacuum container 62, a holder 64 for holding the substrate 1 is provided just above the boat 63. A heater, not shown in the drawing, is attached to the holder 64 and the substrate 1 held by the holder 64 can be heated by operating the heater. A substance adsorbed on the surface of substrate 1 can be released or removed, formation of an impurity layer between the substrate 1 and the phosphor layer 2 formed on the substrate can be prevented, the adhesion between the substrate 1 and the phosphor layer 2 formed on the substrate surface can be strengthen and the layer property of the phosphor layer 2 can be controlled when the substrate 1 is heated.

A rotating mechanism 65 for rotating the holder 64 is attached to the holder 64. The rotating mechanism 65 is constituted by a rotating axis 65a connected to the holder 64 and a motor, not shown in the drawing, as the droving source of the axis. The holder 64 can be rotated while facing to the boat 63 accompanied with rotation of the axis 65a when the motor is driven. A slit may further be equipped between the boat 63 and the substrate 1, if necessary, to control the stream of vapor of the phosphor evaporated from the boat 63.

Other than the above, a vacuum pump 66 is connected to the vacuum container 62 in the vacuum evaporation apparatus 61. Air in the vacuum container 62 is exhausted by the vacuum pump 66 and gas is introduced into the container so that the gas atmosphere in the vacuum container 66 can be held at a designated pressure by driving the vacuum pump 66.

Next, the production method of the scintillator plate 10 according to the present invention is described below.

In the production method of the scintillator plate 10, the above-described vacuum evaporation apparatus is suitably applied. The production method of the scintillator plate 10 is described below according to the vacuum evaporation apparatus 66.

First, the substrate 1 is attached to the holder 64 and a mixture powder containing cesium iodide and thallium iodide is charged into the boat 63 (preparatory process). In such the case, it is preferable that the distance between the boat 63 and the substrate 1 is set at 100 to 1,500 mm and the following processes are carried out while holding such the distance.

After completion of the preparatory process, air in the vacuum container is exhausted by driving the vacuum pump 66 and the atmosphere in the container 62 is made vacuum of not more than 0.1 Pa (vacuum atmosphere forming process). The "vacuum atmosphere" is an atmosphere with a pressure of not more than 100 Pa and a pressured of not more than 0.1 Pa is preferable.

After the vacuum atmosphere forming process, the mixture containing cesium iodide and thallium iodide is heated for 1 hour or more at a temperature of from 350 to 620° C. by applying electric current to the boat 63 (heating process). The heating temperature in the heating process is preferably from 441 to 621° C. since the melting point of cesium iodide and that of thallium iodide are each 621° C. and 441° C., respectively.

After completion of the heating process, the gas in the interior of vacuum container 62 is re-exhausted while the mixture containing cesium iodide and thallium iodide is leaved in the boat 63 and inactive gas such as argon is introduced into the vacuum container 62 so that the vacuum atmosphere in the vacuum container 62 is held at a pressure of 1 Pa or less. After that, the heater of the holder 64 and the motor of the rotation mechanism 65 are driven so that the substrate attached to the holder 64 is heated and rotated while facing to the boat 63.

In such the situation, electric current is applied to the boat 63 so as to heat the mixture of cesium iodide and thallium iodide at 700° C. for a designated time to evaporate the mixture. As a result of that, innumerable columnar crystals 2a are gradually grown on the surface of the substrate 1 and the phosphor layer 2 having a desired thickness is formed (vacuum evaporation process). The scintillator plate 10 relating to the present invention can be produced by the above processes.

According to the above producing method of the scintillator plate 10, the transparency of the interior of each of the columnar crystals 2a formed by the vacuum evaporation process is further increased and the light guide effect in the phosphor layer 2 is raised since the mixture containing cesium iodide and thallium iodide is heated under the designated condition in the heating process before the vacuum evaporation process. Consequently, the light emission efficiency of the phosphor layer 2 can be further improved compared with the usual phosphor layer (refer the later-mentioned examples).

Moreover, the mixture containing cesium iodide and thallium iodide is not exposed to the open air in the course of the heating process and the vacuum evaporation process so that adhesion of moisture to the mixture as the vapor source can be prevented because the vacuum evaporation treatment is carried out in the vacuum evaporation apparatus 66 the same as that used for the heating treatment. Therefore, the white turbid on the phosphor layer 2 can be prevented so as to surely raise the light emission efficiency of the phosphor layer 2.

The above described example may be variously improved or changed in design as long as not depart from the purpose of the present invention.

In one of the improvements and design change, the resistor heating method applied for the treatment in the heating process and the vacuum evaporation process in the above example may be replaced by a treatment using an electron beam or high frequency induction. In this embodiment, the above heating treatment by the resistor heating method is preferred because the method is easily handled, low in the cost and applicable for many kinds of substance. The heating treatment and the vapor depositing treatment of the mixture of cesium iodide and thallium iodide can be made compatibly performed by the same boat 36 by performing the heating treatment by applying the resistor heating method.

In another improvement and design change, the inert gas such as argon and nitrogen or reducing gas such as mixed gas of hydrogen and nitrogen is introduced into the vacuum container 62 in the vacuum atmosphere forming process so that the atmosphere in the vacuum container is made to an inert gas atmosphere or a reducing gas atmosphere each having a pressure of a not more than 0.1 Pa and the heating treatment may be carried out under such the atmosphere. As the reducing gas, a mixture of nitrogen and 5% or less of hydrogen is preferably used from the viewpoint-of safeness though any gas may be used as ling as the gas has reducing ability. However, it is preferable that the gas atmosphere in the vacuum container 62 in the heating process is vacuum atmosphere as above-mentioned.

As another improvement and design change, a shutter, not shown in the drawing, may be provided between the boat 63 and the holder 64 in the vacuum evaporation apparatus 61 for insulating the space between the boat 63 and the holder 64. In such a case, the shutter can prevent a substance other than the objective substances adhering on the surface of the mixture charged in the boat 63 adheres on the substrate 1 at the initial step of the vacuum evaporation process.

The constitution of a radiation image detector 100 having the scintillator plate 10 is described below referring FIGS. 4 and 5 as an example of the application of the above scintillator plate 10.

Figure 4:
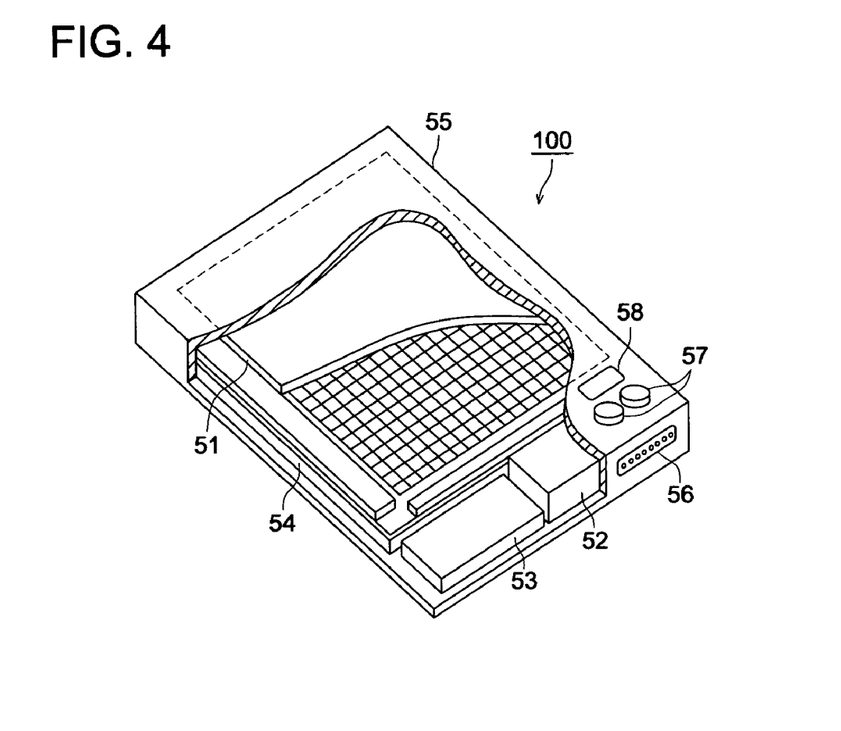
FIG. 4 shows a schematic slant view of partially cut radiation image detector 100.

As is shown in FIG. 4, a image forming panel 51, a control means 52 for controlling the action of the radiation image detector 100, a memory 53 for memorizing image signals out put from the image forming panel 51, a power source 54 for supplying electric power necessary for driving the image forming panel 51 to obtain the image signals, are provided in the case 55 of the radiation image detector 100. On the case 55, a connector 56 for communicating to outside from the radiation image detector 100, an operation means 57 for changing the action of the radiation image detector 100 and a display 58 for indicating the completion of preparation of image forming or indicating that the designated amount of image signals have been stored in the memory 53, are provided according to necessity.

The radiation image detector 100 can be made portable by that the power source 54 the memory 53 for memorizing the image signals of the radiation image are provided in the detector and the radiation image detector is made releasable through the connector 56.

Figure 5:
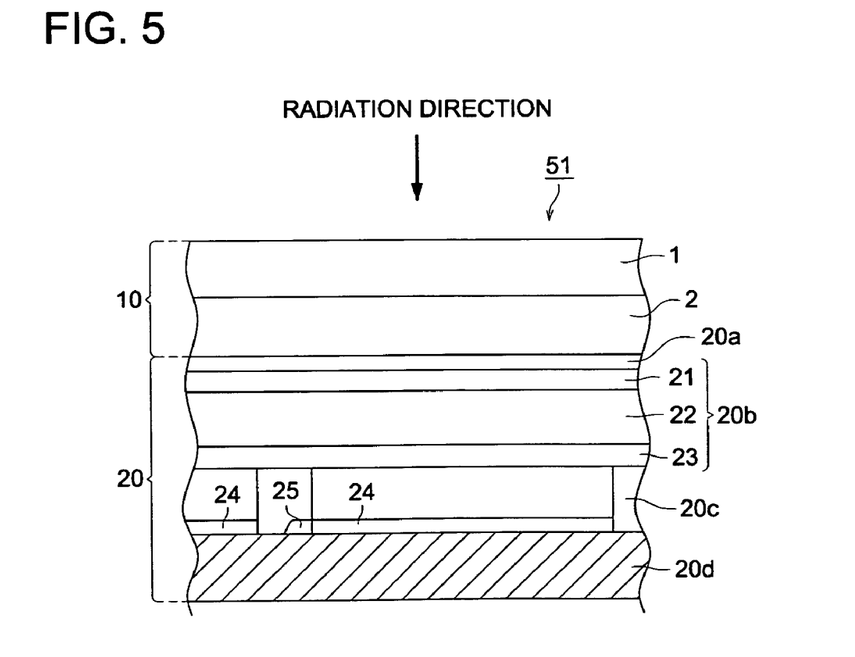
FIG. 5 shows an enlarged cross-section of the image forming panel 15.

As is shown in FIG. 5, the image forming panel 51 is constituted by the scintillator plate 10 and an output board 20 for absorbing electromagnetic waves from the scintillator plate and outputting image signals.

The scintillator plate 10 is arranged on the radiation irradiating side and emits light or electromagnetic waves corresponding to the intensity of the incident radiation.

The output board 20 is arranged on the side opposite to the radiation receiving surface of the scintillator plate, in which a separation layer 20a, a photoelectric conversion element 20b, an image signal outputting layer 20c and a substrate board 20d in the order from the side of scintillator plate 10.

The separation layer 20a is provided for separating the scintillator plate 10 from the other layers, for which an oxinitride is applied, for instance.

The photoelectric conversion element 20b is constituted by a transparent electrode 21, a charge generation layer which generates electric charge when exited by incident light permeated through the transparent electrode 21 and a counter electrode 23 being the counter electrode to the transparent electrode 21. They are arranged in the order of the transparent electrode 21, charge generation layer 22 and counter electrode 23 from the side of the separation layer 20a.

The transparent electrode is an electrode through which the electromagnetic waves to be subjected to photoelectric conversion which is made from an electroconductive transparent material such as indium tin oxide (ITO), $SnO_2$ and ZnO.

The charge generation layer 22 is formed in a state of thin layer on one surface of the transparent electrode 21 and contains organic compounds capable of releasing charge by light so as to function as photoelectric conversion compounds which include an electron donor capable of generating an electron and an electroconductive compound as an electron acceptor. In the charge generation layer 22, the electron donor releases electron when the compound is exited by incident light and the released electron is moved to the electron acceptor side so as to generate charge namely a carrier of positive holes and electrons.

A p-type electroconductive polymer is cited as the electroconductive compound functioning as the electron donor. Preferable examples of the p-type electroconductive polymer include ones having a basic skeleton of polyphenylenevinylene polythiophene, poly(thiophenevinylene), polyacetylene, polypyrrole, polyfluolene, poly(p-phenylene) or polyanyline represented by the following Compound 1-1 to 1-7 or 1-8. In Compounds 1-1 through 1-8, x is preferably an integer of 1 or more.

Compound 1-1

Polyphenylenevinylene

Compound 1-2

Polythiophene

Compound 1-3

Poly(thiophenevinylene)

Compound 1-4

Polyacetylene

-continued

Compound 1-5

Polypyrrole

Compound 1-6

Polyfluolene

Compound 1-7

Poly(p-phenylene)

Compound 1-8

Polyaniline $x \geq 1$

For the electroconductive compound of the electron acceptor, an n-type electroconductive polymer is usable. As the n-type polymer, one having a basic skeleton of polypyridine represented by the following Compound 2-1 or 2-2 are preferable. One having a basic skeleton of poly (p-pyridylvinylene) is particularly preferred. In Compound 2-1 and 2-2, x is an integer of 1 more.

Compound 2-1

Polypyridine

Compound 2-2

Poly(p-pyridylvinylene)

$x \geq 1$

A thickness of the charge generating layer 22 is preferably not less than 10 nm, and particularly preferably not less than 100 nm for obtaining high light absorbing amount and preferably not more than 1 μm, and particularly preferably not more than 300 nm from the viewpoint of that the electric resistance does not become excessively high.

The counter electrode 23 is arranged on the side of the charge generation layer 22 opposite to the side exposed to the electromagnetic waves. For the counter electrode 23, a material can be selected from, for example, usual metal such as gold, silver, aluminum and chromium and the material for the transparent electrode 21, and a material having a low work function of not more than 4.5 eV such as metal, alloy, electroconductive compound or their mixture is preferable for obtaining suitable characteristics.

A buffer layer for preventing the reaction between the charge generation layer 22 and electrodes arranged on both sides thereof, the transparent electrode 21 and the counter electrode 23, may be provided between these electrodes. The buffer layer is formed by, for example, lithium fluoride and poly(3,4-ethylendioxythiophene): poly(4-styrenesulfonate) or 2,9-dimethyl-4,7-diphenyl[1,10]phenanthroline.

The image signal outputting layer 20c accumulates the charge generated by the photoelectric conversion element 20c and outputs signals according to the accumulated charge, which is constituted by a condenser as a charge accumulating element for accumulating every pixel the charge formed by the photoelectric conversion element 20b and a transistor 25 as an image signal outputting element for outputting the accumulated charge as electric signals.

For the transistor 25, for instance, a thin film transistor TFT is used. The TFT may be an inorganic semiconductor type usually used in a liquid crystal display or an organic semiconductor type, and preferably a TFT formed on a plastic film. Though ones using amorphous silicone are known, another one such as a TFT formed on a flexible plastic film by orientating fine CMOS (Nanoblocks) made from single crystal silicone according to Fluid Self Assembly (FSA) technology developed by Alien Technology Co., Ltd., may be used. Moreover, TFT using the organic semiconductors described in Science, 283, 822 (1999), Appl. Phys. Lett., 771488 (1998) and Nature, 403, 521 (2000) are also usable.

For the transistor 25 to be used in the present invention, the TFT produced by FSA technology and that using the organic semiconductor are preferable and the TFT using the organic semiconductor is particularly preferred. The production cost can be reduced by constituting the TFT by using the organic semiconductor because equipment such as a vacuum evaporation apparatus for producing the TFT using silicon is not necessary and the TFT can be produced by applying technologies for printing and ink-jet writing. Furthermore, such the transistor can be formed also on a plastic substrate which is weak against heat since the processing temperature can be lowered.

The transistor 25 accumulates charge generated in the photoelectric conversion element 20b and is electrically connected with a collection electrode, not show in the drawing, which is another electrode of the condenser 24. Charge generated by the photoelectric conversion is accumulated in the condenser 24, and the accumulated charge is read out by driving the transistor 25. Namely, radiation image signals can be output every pixel by driving the transistor 25.

The substrate 20d functions as the support of the image forming panel 51, which may be produced by a material the same as that of the substrate 1.

The function of radiation image detector 100 is described below.

Radiation fallen into the radiation image detector 100 is advanced from the scintillator plate 10 side of the image forming panel 51 to the board 20d side.

When radiation is fallen into the scintillator plate 10, the phosphor layer 2 of the scintillator plate 10 absorbs energy of the radiation and emits electromagnetic waves corresponding to the intensity of the energy. Among the emitted electromagnetic waves, the electromagnetic waves input to the output board 20 permeates through the separating layer 20a and the transparent electrode 21 and reaches to the charge generation layer 22. The electromagnetic waves are absorbed by the charge generation layer 22 and pairs of positive holes and electrons (charge separated state) are generated.

The generated positive hall and electron are each transported to other electrodes (the transparent electrode layer and the electroconductive layer) by interior electric field generated by application of bias voltage supplied by the power source 54 so that photoelectric current is generated.

After that, the positive halls transported to the counter electrode are accumulated in the condenser 24 of the image output layer 20c. Image signals are output by driving the transistor 25 according to the accumulated positive halls and the output image signals are memorized in the memory 53.

The photoelectric conversion efficiency can be raised by the radiation image detector 100 having the scintillator plate 10. Therefore, the S/N ratio in the radiation image on the occasion of image forming by low irradiation amount can be raised and unevenness and line-shaped noise in the image can be prevented.

EXAMPLES

The present invention will now be specifically explained using the examples, however, the present invention is not limited thereto.

The radiation image conversion panels of Examples 1 to 16 and Comparative Example were prepared according to the methods described below.

Example 1

Preparation of Evaporation Source Material

As the raw materials of a plurality of activators, 0.3 mol % of thallium iodide (TlI) and 0.2 mol % of europium iodide ($EuI_2$) based on CsI were mixed with CsI, pulverized and homogenized in a mortar.

Preparation of Radiation Image Conversion Panel

On one surface of a substrate containing a carbon fiber-reinforced resin sheet, the above evaporation source material was vacuum evaporated using the vacuum evaporation apparatus 61 to form a phosphor layer. Namely, at first, the above evaporation source material was loaded in a resistance heating boat 63, then, the substrate 1 was fixed in a substrate holder which was rotated by the rotation mechanism 65, and the distance between the substrate 1 and the resistance heating boat 63 was adjusted to 400 mm. The inside of the vacuum evaporation apparatus 62 was once evacuated and Ar gas was introduced to adjust the vacuum at 0.1 Pa. The temperature of the substrate 1 was kept at 150° C. while rotating at a rate of 10 rpm by the rotating mechanism 65. Then, the resistance heating boat 63 was heated to evaporate the phosphor on the substrate 1 until the thickness of the phosphor increased to 500 mm. Thus the radiation image conversion panel of Example 1 was obtained.

Measurement of Luminance

The obtained radiation image conversion panel of Example 1 was fixed in a CMOS flat panel with the dimension of 10 cm×10 cm (X-ray sensitive CMOS camera system: Shad-o-Box, manufactured by Rad-icon Imaging Corp.) and was irradiated with X-rays generated at a bulb voltage of 80 kVp from the rear surface (the surface where no scintillator phosphor layer was formed). The instantaneous light emission was taken out using an optic fiber and ld to a photodiode (S2281) manufacture by Hamamatsu Photonics KK to measure the amount of light emission. The luminance of the radiation image conversion panel of Example 1 was 2.7. The result was listed in Table 1. In Table 1, the luminance value was listed in Table 1. In Table 1, the luminance value of Comparative Example was set to 1.0.

TABLE 1

| | Activator (1) | Melting Point (° C.) | content (Mol %) | Activator (2) | Melting Point (° C.) | content (Mol %) | Activator (3) | Melting Point (° C.) | content (Mol %) | Luminance |
|---|---|---|---|---|---|---|---|---|---|---|
| Example 1 | TlI | 441 | 0.3 | EuI$_2$ | 580 | 0.2 | — | — | — | 2.7 |
| Example 2 | TlI | 441 | 0.2 | EuI$_2$ | 580 | 0.2 | RbI | 642 | 0.1 | 3.1 |
| Example 3 | TlI | 441 | 0.2 | EuI$_2$ | 580 | 0.2 | CuI | 605 | 0.1 | 2.5 |
| Example 4 | TlI | 441 | 0.3 | InI$_3$ | 351 | 0.2 | — | — | — | 1.4 |
| Example 5 | NaI | 651 | 0.3 | TlI | 441 | 0.2 | — | — | — | 2.7 |
| Example 6 | NaI | 651 | 0.2 | ZnI$_2$ | 446 | 0.2 | RbI | 642 | 0.1 | 3.1 |
| Example 7 | RbI | 642 | 0.2 | TlI | 441 | 0.2 | CuI | 605 | 0.1 | 2.5 |
| Example 8 | RbI | 642 | 0.3 | LaI$_3$ | 778 | 0.2 | — | — | — | 2.1 |
| Example 9 | MnI$_2$ | 613 | 0.2 | YI$_3$ | 1000 | 0.1 | TlI | 441 | 0.2 | 1.9 |
| Example 10 | MnI$_2$ | 613 | 0.2 | TlI | 441 | 0.2 | TiI$_4$ | 155 | 0.1 | 2.8 |
| Example 11 | TlI | 441 | 0.2 | MnI$_2$ | 613 | 0.1 | EuI$_2$ | 580 | 0.2 | 3.7 |
| Example 12 | CuI | 605 | 0.2 | TlI | 441 | 0.3 | — | — | — | 3.2 |
| Example 13 | CuI | 605 | 0.1 | LaI$_3$ | 778 | 0.1 | TiI$_4$ | 155 | 0.3 | 3.9 |
| Example 14 | EuI$_2$ | 580 | 0.3 | KI | 680 | 0.1 | LiI | 446 | 0.1 | 3.1 |
| Example 15 | EuI$_2$ | 580 | 0.2 | ZnI$_2$ | 446 | 0.2 | KI | 680 | 0.1 | 3.4 |
| Example 16 | EuI$_2$ | 580 | 0.1 | TlI | 441 | 0.3 | CuI | 605 | 0.1 | 3.8 |
| Comparative Example | TlI | 441 | 0.5 | — | — | — | — | — | — | 1.0 |

Example 2

A radiation image conversion panel was prepared in the same manner as the radiation image conversion panel of Example 1 except that 0.2 mol % of TlI, 0.2 mol % of EuI$_2$ and 0.1 mol % of rubidium iodide (RbI) based on CsI were used as the plurality of activators. The obtained radiation image conversion panel was adopted as the radiation image conversion panel of Example 2. The luminance was measured in the same manner as in Example 1 and was found to be 3.1. The result was listed in Table 1.

Example 3

A radiation image conversion panel was prepared in the same manner as the radiation image conversion panel of Example 1 except that 0.2 mol % of T1I, 0.2 mol % of EuI$_2$ and 0.1 mol % of copper iodide (CuI) based on CsI were used as the plurality of activators. The obtained radiation image conversion panel was adopted as the radiation image conversion panel of Example 3. The luminance was measured in the same manner as in Example 1 and was found to be 2.5. The result was listed in Table 1.

Example 4

A radiation image conversion panel was prepared in the same manner as the radiation image conversion panel of Example 1 except that 0.3 mol % of T1I and 0.2 mol % of indium iodide (InI) based on CsI were used as the plurality of activators. The obtained radiation image conversion panel was adopted as the radiation image conversion panel of Example 4. The luminance was measured in the same manner as in Example 1 and was found to be 1.4. The result was listed in Table 1.

Example 5

A radiation image conversion panel was prepared in the same manner as the radiation image conversion panel of Example 1 except that 0.3 mol % of sodium iodide (NaI) and 0.2 mol % of TlI based on CsI were used as the plurality of activators. The obtained radiation image conversion panel was adopted as the radiation image conversion panel of Example 5. The luminance was measured in the same manner as in Example 1 and was found to be 2.7. The result was listed in Table 1.

Example 6

A radiation image conversion panel was prepared in the same manner as the radiation image conversion panel of Example 1 except that 0.2 mol % of NaI, 0.2 mol % of zinc iodide (ZnI$_2$) and 0.1 mol % of RbI based on CsI were used as the plurality of activators. The obtained radiation image conversion panel was adopted as the radiation image conversion panel of Example 6. The luminance was measured in the same manner as in Example 1 and was found to be 3.1. The result was listed in Table 1.

Example 7

A radiation image conversion panel was prepared in the same manner as the radiation image conversion panel of Example 1 except that 0.2 mol % of RbI, 0.2 mol % of TlI and 0.1 mol % of CuI based on CsI were used as the plurality of activators. The obtained radiation image conversion panel was adopted as the radiation image conversion panel of Example 7. The luminance was measured in the same manner as in Example 1 and was found to be 2.5. The result was listed in Table 1.

Example 8

A radiation image conversion panel was prepared in the same manner as the radiation image conversion panel of Example 1 except that 0.3 mol % of RbI and 0.2 mol % of lanthanum iodide (LaI$_3$) based on CsI were used as the plurality of activators. The obtained radiation image conversion panel was adopted as the radiation image conversion panel of Example 8. The luminance was measured in the same manner as in Example 1 and was found to be 2.1. The result was listed in Table 1.

Example 9

A radiation image conversion panel was prepared in the same manner as the radiation image conversion panel of Example 1 except that 0.2 mol % of manganese iodide (MnI$_2$), 0.1 mol % of yttrium iodide (YI$_3$) and 0.2 mol % of TlI based on CsI were used as the plurality of activators. The obtained radiation image conversion panel was adopted as the radiation image conversion panel of Example 9. The luminance was measured in the same manner as in Example 1 and was found to be 1.9. The result was listed in Table 1.

Example 10

A radiation image conversion panel was prepared in the same manner as the radiation image conversion panel of Example 1 except that 0.2 mol % of MnI$_2$, 0.2 mol % of TlI and 0.1 mol % of titanium iodide (TiI$_4$) based on CsI were used as the plurality of activators. The obtained radiation image conversion panel was adopted as the radiation image conversion panel of Example 10. The luminance was measured in the same manner as in Example 1 and was found to be 2.8. The result was listed in Table 1.

Example 11

A radiation image conversion panel was prepared in the same manner as the radiation image conversion panel of Example 1 except that 0.2 mol % of TlI, 0.1 mol % of MnI$_2$ and 0.2 mol % of EuI$_2$ based on CsI were used as the plurality of activators. The obtained radiation image conversion panel was adopted as the radiation image conversion panel of Example 11. The luminance was measured in the same manner as in Example 1 and was found to be 3.7. The result was listed in Table 1.

Example 12

A radiation image conversion panel was prepared in the same manner as the radiation image conversion panel of Example 1 except that 0.2 mol % of CuI and 0.3 mol % of TlI based on CsI were used as the plurality of activators. The obtained radiation image conversion panel was adopted as the radiation image conversion panel of Example 12. The luminance was measured in the same manner as in Example 1 and was found to be 3.2. The result was listed in Table 1.

Example 13

A radiation image conversion panel was prepared in the same manner as the radiation image conversion panel of Example 1 except that 0.1 mol % of CuI, 0.1 mol % of LaI$_3$ and 0.3 mol % of TiI$_4$ based on CsI were used as the plurality of activators. The obtained radiation image conversion panel was adopted as the radiation image conversion panel of Example 13. The luminance was measured in the same manner as in Example 1 and was found to be 3.9. The result was listed in Table 1.

Example 14

A radiation image conversion panel was prepared in the same manner as the radiation image conversion panel of Example 1 except that 0.3 mol % of EuI$_2$, 0.1 mol % of KI and 0.1 mol % of LiI based on CsI were used as the plurality of activators. The obtained radiation image conversion panel was adopted as the radiation image conversion panel of Example 14. The luminance was measured in the same manner as in Example 1 and was found to be 3.1. The result was listed in Table 1.

Example 15

A radiation image conversion panel was prepared in the same manner as the radiation image conversion panel of Example 1 except that 0.2 mol % of EuI$_2$, 0.2 mol % of ZnI$_2$ and 0.1 mol % of KI based on CsI were used as the plurality of activators. The obtained radiation image conversion panel was adopted as the radiation image conversion panel of Example 15. The luminance was measured in the same manner as in Example 1 and was found to be 3.4. The result was listed in Table 1.

Example 16

A radiation image conversion panel was prepared in the same manner as the radiation image conversion panel of Example 1 except that 0.1 mol % of EuI$_2$, 0.3 mol % of TlI and 0.1 mol % of CuI based on CsI were used as the plurality of activators. The obtained radiation image conversion panel was adopted as the radiation image conversion panel of Example 16. The luminance was measured in the same manner as in Example 1 and was found to be 3.8. The result was listed in Table 1.

Comparative Example

A radiation image conversion panel was prepared in the same manner as the radiation image conversion panel of Example 1 except that no activator other than TlI (0.5 mol %) was used. The obtained radiation image conversion panel was adopted as the radiation image conversion panel of Comparative Example. The luminance was measured in the same manner as in Example 1 and the value was set to 1.0. The result was listed in Table 1.

As shown in Table 1, it was found in the present invention that an effect of improvement of luminance was observed by incorporating a plurality of activators having different melting points in the source material of CsI based phosphor layer. By comparing the radiation image conversion panels of Examples 1, 5 and 12 with that of Comparative Example, it was shown that the improvement of luminance was possible by incorporating a first activator having the melting point within ±50° C. of the melting point of CsI (621° C.), while the same or further improvement was possible by incorporating a second activator having a melting point different from the melting point of the first activator by 100° C. or more. Specifically, by comparing the radiation image conversion panels of Examples 1 to 3 with that of Example 4, it was found that further improvement of luminance was possible when the highest melting point and the lowest melting point of the plurality of activators was different by 100° C. or more.

Example 101

(1) Preparation of Samples
 (101.1) Preparation of Sample 101
 Cesium iodide (CsI) and 0.03 mol % of thallium iodide TlI as an activator were mixed and the mixture was crushed and mixed in a mortar so as to be uniform. After that, a phosphor layer was formed on a substrate of a carbon fiber-reinforced resin sheet by applying a vacuum evaporation apparatus 61 shown in FIG. 3.

In detail, the above powdered mixture was charged into the boat as the vaporizing raw material and a substrate was attached on the holder, and the distance between the boat and the holder was set at 400 mm (preparatory process). And then the vacuum pump was driven and air in the vacuum container was once exhausted so as to make the interior pressure of the container to a vacuum atmosphere of $1.0 \times 10^{-4}$ Pa (vacuum atmosphere forming process). After that, electric current was applied to the boat through the electrode for heating the mixture charged in the boat at 350° C. for 2 hours (heating process).

The gas in the vacuum container was evacuated again and the pressure in the interior of the container was adjusted to 0.1 Pa by introducing argon. After that, the motor of the rotating mechanism and the heater of the holder were driven so that the substrate was heated at 150° C. while rotating the substrate at a rate of 10 rpm. In such the situation, the mixture charged in the boat was heated and evaporated at 700° C. by applying larger electric current to the boat through the electrode to form a phosphor layer. The vacuum evaporation was completed when the thickness of the phosphor layer was reached at 500 μm (vacuum evaporation process). Thus obtained plate was referred to as Sample 101.

(101.2) Preparation of Samples 102 through 117

Samples 102 through 117 were prepared in the same manner as in Sample 1 except that the kind of activator, the mixing ratio of the activator to CsI, the treating atmosphere during the heating process and the heating temperature for the heating process were changed as shown in the following Table 2, provided that, in the preparation of Sample 15, the vacuum degree in the vacuum container was not controlled during the heating process and the mixture was not heated.

(2) Measurement of Luminance of the Sample

Each of Samples 101 through 117 was irradiated with X-rays at a bulb voltage of 80 kVp from the back side (the side on which no phosphor layer was formed) and instantaneously emitted light was taken out through an optical fiber. The amount of the taken out light was measured by a photodiode S2281 manufactured by Hamamatsu Photnics KK. Thus measured emitted light amount was defined as luminance of emitted light (sensitivity). Measurement results of each of Sample 101 through 117 were listed in Table 2. The values of the luminance of Samples 101 through 117 in Table 2 were a value when the luminance of Sample 15 is set at 1.0.

TABLE 2

| Sample No. | Activator Kind | *1 | Treatment atmosphere (Gas introduction) | Heating temperature (° C.) | *2 |
|---|---|---|---|---|---|
| 101 | TlI | 0.3 | Vacuum ($1 \times 10^{-4}$ Pa) | 350 | 1.6 |
| 102 | TlI | 0.3 | Vacuum ($1 \times 10^{-4}$ Pa) | 450 | 1.8 |
| 103 | TlI | 0.3 | Vacuum ($1 \times 10^{-4}$ Pa) | 500 | 2.0 |
| 104 | TlBr | 0.3 | Vacuum ($1 \times 10^{-4}$ Pa) | 500 | 1.8 |
| 105 | NaI | 0.3 | Vacuum ($1 \times 10^{-4}$ Pa) | 500 | 1.2 |
| 106 | TlI | 0.3 | Inert gas ($N_2$) | 500 | 1.8 |
| 107 | TlI | 0.3 | Reducing gas ($N_2$ (97%) + $H_2$ (3%)) | 500 | 2.2 |
| 108 | TlI | 0.005 | Vacuum ($1 \times 10^{-4}$ Pa) | 500 | 1.2 |
| 109 | TlI | 0.01 | Vacuum ($1 \times 10^{-4}$ Pa) | 500 | 1.7 |
| 110 | TlI | 0.1 | Vacuum ($1 \times 10^{-4}$ Pa) | 500 | 1.8 |
| 111 | TlI | 1.0 | Vacuum ($1 \times 10^{-4}$ Pa) | 500 | 2.1 |
| 112 | TlI | 10.0 | Vacuum ($1 \times 10^{-4}$ Pa) | 500 | 1.8 |
| 113 | TlI | 15.0 | Vacuum ($1 \times 10^{-4}$ Pa) | 500 | 1.2 |
| 114 | TlI | 0.3 | Vacuum ($1 \times 10^{-4}$ Pa) | 620 | 2.2 |
| 115 | TlI | 0.3 | — | — | 1.0 |
| (Comparative) 116 (Comparative) | TlI | 0.3 | Vacuum ($1 \times 10^{-4}$ Pa) | 300 | 1.0 |
| 117 (Comparative) | TlI | 0.3 | Vacuum ($1 \times 10^{-4}$ Pa) | 650 | 0.9 |

*1: Mixing ratio (Mol %)
*2: Luminance of emitted light

The samples each prepared by heating for 1 hour in the heating process gave results approximately the same as those of Samples 101 through 117, although the results are not shown.

(3) Conclusion

As is shown in Table 2, Samples 101 through 114 were higher in the luminance of emitted light than that of Samples 115 through 117. Therefore, it was understood that the heating at a temperature of from 350 to 620° C. for 1 hour or in the heating process is useful.

It was understood by the comparison of Samples 103 and 109 to 113 with Samples 108 and 113 that Samples 103 and 109 to 113 were higher in the emitted light luminance than Samples 108 and 113 and a mixing ratio of TlI to CsI of 0.01 to 10 mol % was specifically useful.

What is claimed is:

1. A scintillator plate for radiation comprising a substrate having thereon a phosphor layer comprising CsI and two or more activators each having a melting point different from a melting point of CsI, the scintillator plate emitting light at wavelengths of 300 to 800 nm when irradiated with radiation, wherein
    each content of the two or more activators is 0.01 mol % or more based on CsI;
    the scintillator plate is produced by forming the phosphor layer on the substrate via a vacuum evaporation method using a source material comprising CsI and the two or more activators; wherein
    the two or more activators comprise a first activator having a melting point within ±50° C. of the melting point of CsI;
    the two or more activators comprise a second activator having a melting point different from the melting point of the first activator by 100° C. or more, and
    the second activator is thallium iodide.

2. The scintillator plate of claim 1, wherein
    the first activator comprises at least one selected from the group consisting of copper iodide, europium iodide, sodium iodide, rubidium iodide and manganese iodide.

3. The scintillator plate of claim 1, wherein a content of the first activator is 0.1 mol % or more based on CsI.

4. The scintillator plate of claim 1, wherein a content of the second activator is 0.1 mol % or more based on CsI.

* * * * *